Aug. 18, 1931.  C. D. ALLEN  1,819,858
AUTOMATIC VARIABLE OIL CONTROL VALVE FOR LUBRICATORS
Filed April 5, 1929  2 Sheets-Sheet 1
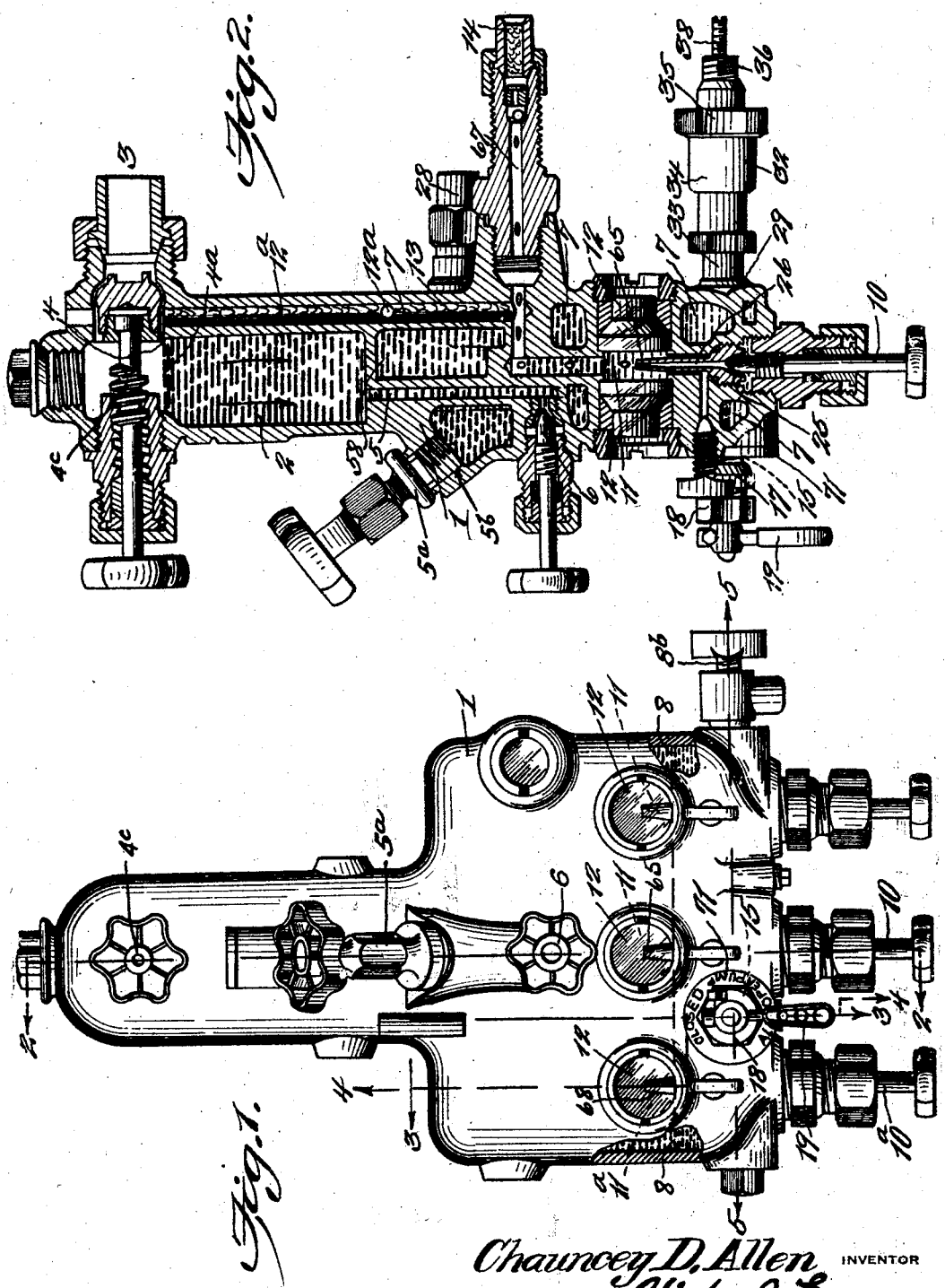
Chauncey D. Allen INVENTOR
BY Victor J. Evans
his ATTORNEY

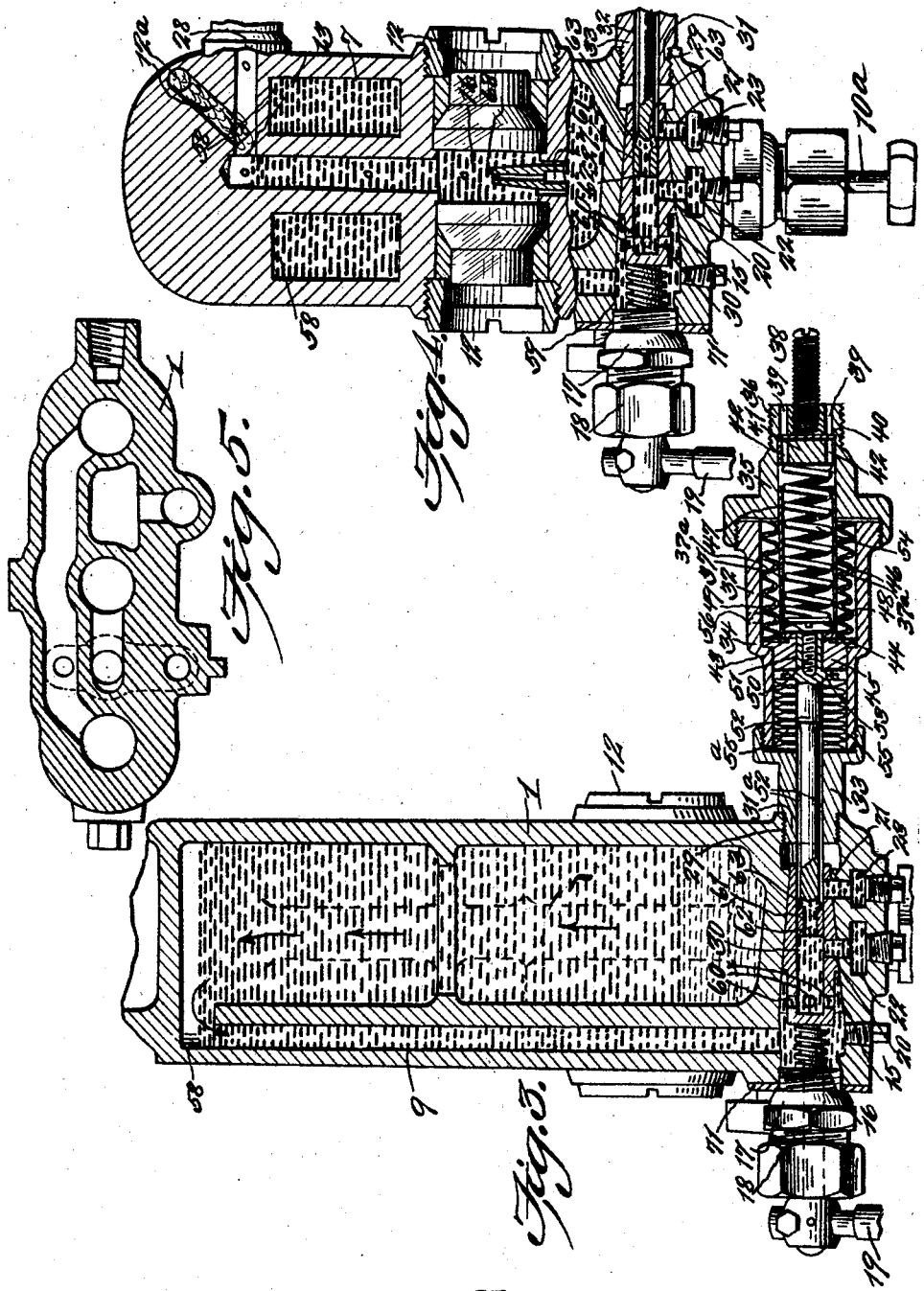

Patented Aug. 18, 1931

1,819,858

UNITED STATES PATENT OFFICE

CHAUNCEY D. ALLEN, OF PHILADELPHIA, PENNSYLVANIA

AUTOMATIC VARIABLE OIL CONTROL VALVE FOR LUBRICATORS

Application filed April 5, 1929. Serial No. 352,812.

The present invention relates to an improved automatic variable oil control valve, and in using this type of automatic variable oil control valve in connection with hydrostatic lubricators is to render the lubricator automatically variable in its feed of lubrication to those parts of an engine requiring lubricant.

The introduction, into the oil passage between the reservoir and the sight feed regulating valves of a lubricator, known in the trade as the Detroit Bullseye, an oil control valve aids greatly to the ease of operation. It provides a means, whereby an operator may instantly start, stop or throttle the rate of feed. It also eliminates the necessity of shutting off the feed regulating valves at a terminal or while refilling on the road, and consequently eliminates the necessity of opening and readjusting these valves after refilling. In lubricators, which are not supplied with oil control valves it is necessary to close, open and adjust the regulating valves at frequent intervals. Obviously this not only shortens the life of the valves but the length of time consumed in this operation. Hence it is impractical to require the operator to shut off the cylinder feeds during stops, which can easily be done by the use of the oil control valve. It will also be obvious, therefore, that the oil control valve results in much saving in oil and a substantial increase in oil mileage.

A purpose of this invention is to provide an attachment for the oil control valve, applicable thereto, said device including means to insure the feed from the oil control valve automatically variable to the outlet, and thence to the various parts of the engine needing lubricant.

Another purpose of this invention is to provide an attachment for any hydrostatic lubricator of the visual feed type, and especially to a hydrostatic lubricator having a control valve, and applicable to such type of lubricator without entirely disassembling the same and revamping the construction thereof to any excessive degree, excepting to say that a plug of the hydrostatic lubricator is removed for two purposes, one purpose being to increase the diameter of the bore of the control valve and to ream out and thread the opening which previously received the plug, in order to apply the attachment into said opening and to fit a hollow movable spindle or rod into the control valve proper.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in side elevation of the hydrostatic lubricator, showing the control valve.

Figure 2 is a vertical sectional view on line 2—2 of Figure 1, showing a lubricator of a known type, such as the Detroit Bullseye kind.

Figure 3 is a sectional view on line 3—3 of Figure 1.

Figure 4 is a view similar to Figure 3, but showing additional parts of the lubricator, by breaking away certain construction.

Figure 5 is a view on line 5—5 of Figure 1, showing the various passages leading from the control valve.

Referring to the drawings, 1 identifies the casing of a hydrostatic lubricator of a known type of construction, preferably the Detroit Bullseye visual kind, wherein a hydrostatic principle is involved.

The operating principle of the lubricator is that of a column of water exerting a pressure upon oil in a reservoir, in such a manner as to force the oil past one or more regulating valves and thence to the point of delivery.

To maintain a constant column of water in the condenser chamber 2 of the lubricator, steam is allowed to enter the lubricator at 3, this steam being received from a boiler at boiler pressure. The water resulting from the condensation of the steam fills the condenser chamber 2 to a point as identified at 4. The condenser chamber 2 is connected to a reservoir by a water passage 5. With a water valve 6 open water enters the reservoir 7 and fills all the space not occupied by oil. Due to the low specific gravity the oil floats on the water, the weight of the column of water being measured from the point 4a to a point 8 (and which is several ounces per square inch) exerted upon the body of oil in the reservoir forces the oil in a manner as indicated by arrows into the oil passage 9 and past the regulating valve 10. Drop by drop the oil enters the sight feed chamber 11, whereby the drops are discernible through the bull's eyes 12. The sight feed chamber 11 is kept filled with water through the condensation of steam entering from the equalizing passage 12a. The drops of oil float to the top of the water to a point as identified at 13 and are carried by the circulation of steam from the equalizing passage 12a into the oil delivery pipe and thence to the point of lubrication, which in the present instance may be at the point 14, to where a pipe (not shown) from the air pump (not shown) may be connected.

A particularly important factor to be noted is that the boiler pressure has no effect on the operation of the lubricator, because by virtue of the equalizing passage 12a, there is the same steam pressure at both ends of the lubricator. What causes the lubricator to feed has been explained above—the weight of the column of water as measured from 4a to 8, exerting its pressure on the oil.

*To fill or refill.*—Move the oil control valve 15 to "closed" position, close the water valve 6 and steam valve 4c. Open drain valve 8b, and then loosen filler plug 5a. By so operating these parts the lubricator is allowed to empty, and when the lubricator is emptied of water, a little oil will come out through the drain valve 8b, then the lubricator is ready for filling. The drain valve 8b is then closed, the filler plug 5a is then removed, and through the opening 5b the lubricator may be filled with clean strained valve oil. The filler plug is then replaced, which under normal conditions can be seated by hand, but should a wrench be used because of a worn seat, care should be taken to use a suitably sized wrench that will not distort the plug or twist it off below its square portion.

If the lubricator is under pressure proceed as before, but remove the filler plug 5a slowly to allow the pressure above the oil to escape and the air to enter. Fill the reservoir full. If there is not sufficient oil for this purpose, use water to make up the required quantity. This method will expel the air and enable the feeds to start without exhausting the water from the condenser or materially lowering its level.

When filling a lubricator of the Detroit Bullseye locomotive type, (which is a commercially well known construction) a piece of waste should be placed under the filler opening to catch any oil that otherwise would be allowed to run down the sides and especially over the air pump sight feed glass. In very cold weather the oil may be heated so it will pour more freely into the lubricator.

The control valve 15, which is of tapered contour, and its spindle 16 (which passes through nipples 17 and 18) is provided with a handle 19. This control valve on the bull's eye lubricator of the present type is hand operated, in order to control the flow of lubricant to the place of consumption. This control valve is usually set to govern the flow of lubricant into the ports 20 and 21, from where the lubricant passes into the passages 22 and 23 and then past the needle valve 10 at the point 25 through the passage 26, and drop by drop enter the sight feed chamber 11. The lubricant that enters the passage 23 flows past another valve 10a similar to 10 at a point similar to 25 and thence into the passage 27 similar to 26, and then into another sight feed chamber 11a and into the engine cylinder by way of an oil pipe 28, as shown in Figure 4.

To render this control valve automatic or rather to control the flow of oil from the control valve automatically variable according to the steam pressure as in the co-pending application filed December 19, 1927, Serial No. 241,195, which matured into Patent No. 1,724,865, a plug not shown but which formerly was threaded in the opening at 29 is removed.

The control valve is then removed, and its passage 30 may be reamed out, for the purpose of making it larger in order to provide a guide for a control spindle. The control valve is then replaced in its position as in Figure 3, and a spindle of a tool is inserted in the bore of the control valve, the opening 29 being reamed out and made larger, and then threaded to receive the threaded extension 31 of the attachment, which cooperates with the control valve for the purpose of controlling the flow of lubricant through the ports 20 and 21 and the passages 22 and 23, the flow being automatically varied.

This attachment comprises a casing 32 consisting of the sections 33, 34 and 35, which are threadingly united, and the section 33 has its extension 31 threaded in the opening 29 of the casing of the lubricator. The section 34 of the casing 32 is intermediate the section 33 and 35, the reduced end portion of the latter being threaded at 36 in order to connect with a steam pipe not shown, so as to conduct steam, which may build up to approximately one hundred pounds, into the section 35, and thence into the bellows 37. The threaded extension 36 receives a screw 38 and is provided with opposite openings or passages 39, through which steam passes. The interior of the extension 36 has an annular shoulder 40, against which a circular head 41 engages. This head has openings or passages 42 which register with the passages or openings 39 to permit steam to enter the section 35 and thence into the bellows.

On the interior of the section 34 of the attachment substantially midway its ends an annular shoulder 43 is provided, and against which an annular flange 44 of a circular head 45 engages. Disposed for the greater part of its length within the section 34 is a tube 46, a relatively small portion of which at 47 is guided in the section 35. The inner end of the tube has an inturned annular flange 48, which lies against a boss of the circular head 45, there being a screw 49 with its shank 50 threaded into an extension sleeve 51 of a spindle 52 of the attachment. This sleeve extension engages through the circular head 45.

At a point where the sleeve extension 51 protrudes from and is integral with the spindle 52, an annular flange 53 is constructed, and against which the circular head 45 engages.

A coil spring 54 is mounted within the tube 46 and is interposed between the screw 49 and the circular head 41, thereby acting to hold the annular flange 44 against the shoulder 43. The purpose of this spring is to set the pressure or rather to determine the pressure. For instance the adjustment of the spring to a certain required tension coupled with the opening of the throttle to a certain point equals the boiler pressure on the lubricator.

The sections 33 and 34 of the casing, which constitutes an element of the attachment, are threaded together, as are the sections 34 and 35. Interposed between the annular flange 53 and the end of the section 33 of the casing is a bellows 55. The bellows 37 is relatively twice the area of the bellows 55 and when the tension of the spring 54 is adjusted to substantially 50 lbs. oil may be fed to the steam pipes and cylinders when throttle is open to a certain point, which with the spring tension equals boiler pressure on the lubricator. The wall of the section 34 has an outlet orifice 56, to permit of the escape of steam or oil in case of fracture of either bellows.

In the operation of the lubricator, the water derived from the condensation of steam in the condenser 2 flows through the passage 5 and floats the oil to the greater upper portion of the reservoir 57, there remaining an airspace or expansion chamber 58 between the level of the oil and the upper end of the reservoir, giving the oil a chance for expansion, that may result in an excess steam pressure at the point of condensation. This expansion space will also enable the operator to fill the reservoir to its capacity, without fear of damage, though this is not always necessary, that is to fill the reservoir to its full capacity. The oil is forced through the passage 9 as in Figure 3, due to overflowing, then into the chamber 59, and thence through the diametrically opposite openings 60 of the control valve 15, into the passage 30 of the control valve.

However the spindle 52 has its opposite ends enlarged, corresponding in diameter to the diameter of the passage 30. The enlarged end 61 of the spindle 52 reciprocates in the passage 30 according to the pressure. The greater intermediate portion of the spindle 52 is therefore of less diameter than the opposite ends thereof, and the inner enlarged end 61 of the spindle has a central bore 62 having branches 63. These branches 63 open where the reduced diameter of the spindle 52 ceases, so that the oil can flow either around the reduced diameter of the spindle, and into the bellows 52, or into the openings 20 and 21 and through the passages 22 and 23.

The fact is the spindle controls the oil or lubricant at this point, while the needle feed valves 10 and 10a heretofore were used to control the oil by hand. However, with the attachment applied to this type of lubricator, the needle control valves 10 and 10a are set to permit of a required flow of oil, drop by drop through and beyond the discharge nozzles 65, it being obvious upon reference to Figures 1 and 2 that the drop by drop feed is visible through the transparent bull's eye 12. Referring to Figure 2 it is to be noted that the oil drop by drop passes out through the outlet passage 67 and thence to an oil pipe (not shown) to an air pump (not shown), while the drop feed leaving the nozzle 68 shows in Figure 1 (which, is right back of the nozzle 65 shown in Figure 2, or shown in Figure 4) passes out through a passage (not shown) and leaves the lubricator at a point identified at 28. At this point 28 an oil passage leading to an engine cylinder may be connected, so that the lubricant or oil may be conveyed to the engine cylinder. The water passing through the passage 5 is controlled by the water valve 6. As previously stated the oil is forced through the passage 9 and the control valve 15, by hydrostatic pressure previously explained, the rate of feed being controlled by the adjustment of the needle valves 10 and 10a.

After leaving the discharge nozzles 65 and 68, the drops of oil float up through the water in the sight feed chambers, and when the oil reaches a point as identified at 13 it is picked up by the steam coming down through the equalizing passage 12a, which carries it out from the lubricator into the oil pipe (not shown) but which communicates with the passage 67 at 14, and thence to the steam chest plugs located at the engine cylinders, steam chests or steam pipes.

The oil control valve 15 has a lever handle 19 and index plate 71, and is so designed that from the "Closed" position a half turn to the "All open" position will open all feeds; or a quarter turn, the feed to air pump only and vice versa. By moving the handle away from the "All open" or the pump position, the rate of feed to the different points can be throttled.

While this attachment is automatic in connection with the lubricator it is obvious that the regulating feed valves 10 and 10a may still be adjusted by hand, in order to permit oil to be fed into the cylinders and valves, the quantity being approximately what is normally used. However with this improved attachment the feed regulating valves can be set or adjusted by hand, and when once said valves 10 and 10a have been adjusted, the use of the oil control valve makes the lubrication an instant operation and insures correct amount of lubrication under all conditions, that is should the locomotive be pulling up grade, or traveling on level road, or going down grade, just the right amount of lubrication will be supplied to the various parts which need lubrication. The operator knows that as soon as the lubricator has reached its proper temperature the oil will feed at the rate required.

The adjustment of the lubricator feeds in night service or where the device is inconveniently located is always a matter of more or less difficulty. As the control valve does away with the opening and closing of the different feed valves when starting and stopping the device it becomes a great convenience to the operator, and under all conditions, night or day, the operator can by the sense of touch alone press the handle lever to this control valve in any one of the three positions.

However the attachment as herein shown enables the feed of oil to be automatically variable according to the steam pressure, as is set forth in the co-pending case previously identified herein.

The pressure from the boiler (approximately 200 lbs.) is turned into the lubricator in the regular manner. This pressure acting on oil in lubricator forces its way through the passages 59, 30 and 52a, referring to Figure 3, into the bellows chamber 55a, causing bellows 55 to expand against the spring 54 with the spindle or rod 52 attached, closing the port or passage 21, shutting off oil supply to the port or passage 23.

In this position oil feeds to the pump in the regular way but no oil goes to the steam pipe or cylinder. When engine is started by opening throttle and pressure in steam pipe builds up to approximately 100 lbs., steam enters passages 39 and 42 and into bellows 37, by way of apertures 37a expanding same against the action of bellows 55. The bellows 37 being larger in area than bellows 55, and bellows 37 being assisted by tension of spring 54, force rod inward, opening the port or passage 21 for the oil supply to enter the passage or port 23.

In this position oil feeds the pump, steam pipes or cylinder as regulated by individual oil feed valves.

It is obvious that with the bellows 37 twice the area of bellows 55 and the tension of the spring 54 adjusted to 50 lbs., or any other predetermined tension, oil will be fed to the steam pipes and cylinders when required only, and not when standing. When drifting with cracked or light throttle, the spring tension regulated accordingly, oil will be fed to the cylinders and valves.

The invention having been set forth, what is claimed is:

1. In an oil control valve for hydrostatic lubricators comprising a casing having an oil passage, and provided with outlet ports, an oil control valve mounted in the casing and having passages communicating with the oil passage and the ports, an attachment connected to the casing and having a spindle telescopically movable in the valve, said attachment comprising a casing, expansible means of different areas in the attachment casing, said spindle having a head interposed between the expansible means of different areas, said expansible means of different areas being responsive to the variation of oil and steam pressure in the valve, to govern the position of the spindle with relation to the ports.

2. An oil control valve, comprising a casing having an oil passage and provided with outlet oil ports, a control valve having a passage and adapted for controlling the flow of oil through the ports, an attachment comprising a casing including a spindle movable within the oil control valve, said spindle having a head, a diaphragm expansible means with an expansible chamber on one side of said head, an expansible means of different area with an expansible chamber on the other side of said head, the first expansible chamber adapted to receive varied oil and steam pressure from around the spindle, the second expansible chamber adapted to receive varied steam pressures, the expansible diaphragms being responsive to the variation of oil pressure on one side and steam pressure on the other side for actuating the spindle and rendering the out flow of oil through the ports automatically variable.

3. In an attachment for oil control valves for hydrostatic lubricators, the combination with an oil control valve, of a casing for the valve provided with an oil passage and oil outlet passages, said control valve having outlet ports to associate with the outlet passages, said attachment comprising a casing having a movable spindle including a head and extending into the control valve and provided with passages to associate with the outlet ports, an expansible chamber for the reception of oil on one side of the spindle head, an expansible chamber of a greater area on the other side of said spindle head for the reception of steam pressure, the spindle and its head being responsive to the variations of oil and steam pressure on one side and steam pressure on the other side, to render the position of the spindle automatically variable with relation to the ports.

4. In an attachment for oil control valves on hydrostatic lubricators, the combination with an oil control valve having a passage for the reception of oil and provided with outlet ports, said attachment comprising a casing having an expansible oil chamber and an expansible steam chamber, one of the chambers being of greater area than the other, a spindle movable in the attachment casing and operatively associated with the outlet ports of the control valve, said spindle having a head interposed between the two chambers, which are responsive to the variation of oil pressure on one side and steam pressure on the other side of the head, for regulating the position of the spindle with relation to the ports, thereby rendering the out flow of oil through the ports automatically variable.

5. In an attachment as indicated comprising a casing and a movable spindle therein, the combination with an oil control valve having a passage, a portion of which movably receives the spindle, said valve passage adapted for the reception of oil, said valve having outlet ports, said spindle having passages for association with the ports for governing the out flow of oil, the spindle having a head in the attachment casing, an expansible oil chamber on one side of the head comprising an expansible bellows or diaphragm, an expansible steam chamber of greater area than the expansible oil chamber on the other side of the head, said steam chamber comprising a spring tensioned expansible bellows, said oil and steam expansible chambers being responsive to the fluctuations of oil and steam pressure on respective sides of the head, for governing the position of the spindle, and rendering the out flow of oil through the ports automatically variable.

6. A hydrostatic lubricator for engines having an oil control valve manually rotatably adjusted to regulate the feed of lubricant to parts of the engine, a spindle valve reciprocable within the control valve, and means automatically responsive to variations in the steam pressure with the engine throttle open sufficiently to render the feed of the oil according to said variations in the steam pressure.

7. An oil control valve for hydrostatic engine lubricators, comprising a valve member to be manually rotatably adjusted to determine the rate of oil feed, a reciprocating spindle valve in the rotating valve member and cooperatively associated therewith to further regulate the oil feed, means automatically responsive to the action of oil on one side of the spindle valve and steam on the other side to automatically govern the spindle valve relative to the rotating valve member, whereby the feed of oil may be regulated responsive to variations in the steam pressure.

8. An oil control valve for hydrostatic engine lubricators, comprising a valve member to be manually rotatably adjusted to determine the rate of oil feed, a reciprocating spindle valve in the rotating valve member and cooperatively associated therewith to further regulate the oil feed, means automatically responsive to the action of oil on one side of the spindle valve and steam on the other side to automatically govern the spindle valve relative to the rotating valve member, whereby the feed of oil may be regulated responsive to variations in the steam pressure, tensioning means for the spindle valve, and means for regulating the tensioning means, whereby when the engine throttle is open sufficiently coupled with the tensioning means equals the boiler pressure on the lubricator.

9. An oil control valve for hydrostatic engine lubricators, comprising a valve member to be manually rotatably adjusted to determine the rate of oil feed, a reciprocating spindle valve in the rotating valve member and cooperatively associated therewith to further regulate the oil feed, means automatically responsive to the action of oil on one side of the spindle valve and steam on the other side to automatically govern the spindle valve relative to the rotating valve member, whereby the feed of oil may be regulated responsive to variations in the steam pressure, tensioning means for the spindle valve, and means for regulating the tensioning means, whereby when the engine throttle is open sufficiently coupled with the tensioning means equals the boiler pressure on the lubricator, and means to permit of the escape of oil or steam from either or both sides of an element of the spindle valve, in case of failure of operation of the spindle valve operating means.

10. An oil control valve for hydrostatic engine lubricators, comprising a valve member to be manually rotatably adjusted to determine the rate of oil feed, a reciprocating spindle valve in the rotating valve member and cooperatively associated therewith to further regulate the oil feed, means automatically responsive to the action of oil on one side of the spindle valve and steam on the other side to automatically govern the spindle valve relative to the rotating valve member, whereby the feed of oil may be regulated responsive to variations in the steam pressure, and means to permit of the escape of oil and steam should the spindle valve operating means fail to operate.

In testimony whereof he affixes his signature.

CHAUNCEY D. ALLEN.